United States Patent Office 3,404,153
Patented Oct. 1, 1968

3,404,153
PREPARATION OF 7-[MONO- OR DI-(ACYLOXY)-METHYL] - 4 - HYDROXY - 1,8 - NAPHTHYRIDINES AND DERIVATIVES THEREOF
George Y. Lesher, Schodack, N.Y., assignor to Sterling Drug Inc., New York, N.Y., a corporation of Delaware
No Drawing. Filed Jan. 26, 1965, Ser. No. 428,221
5 Claims. (Cl. 260—295.5)

This invention relates to a process for preparing 1,8-naphthyridine derivatives and compositions produced thereby.

The process aspect of the invention sought to be patented is described as residing in the process of reacting the 8-oxide of a 4-hydroxy-7-substituted-1,8-naphthyridine where the 7-substituent is methyl or lower-alkanoyloxymethyl, with a lower-alkanoic anhydride to prepare, respectively, a 4-hydroxy-7-(lower-alkanoyloxymethyl)-1,8-naphthyridine or a 4-hydroxy-7-[di-(lower-alkanoyloxy)methyl]-1,8-naphthyridine.

In this process, the 7-methyl group can be substituted by lower-alkyl, phenyl or phenyl-(lower-alkyl). Here and elsewhere througout this specification, it will be understood the benzene ring of phenyl can bear any number and kind of substituents such as would occur to the man skilled in organic chemistry. Solely for illustration, and without limitation, such substituents include lower-alkyl, lower-alkoxy, halo (chloro, bromo, iodo or fluoro), nitro, lower - alkylmercapto, lower-alkanoylamino, lower-alkanoyloxy, di-(lower-alkyl)amino, and the like.

Preferred embodiments of this process aspect, for purposes of illustration but without limiting the generality of the foregoing, are: the process for preparing a lower-alkyl 4 - hydroxy-7-(lower-alkanoyloxymethyl)-1,8-naphthyridine-3-carboxylate by reacting the 8-oxide of a lower-alkyl 4-hydroxy-7-methyl-1,8-naphthyridine-3-carboxylate with a lower-alkanoic anhydride; and, the process for preparing a lower-alkyl 7-[di-(lower-alkanoyloxy)methyl]-4-hydroxy-1,8-naphthyridine-3-carboxylate by reacting the 8-oxide of a lower-alkyl 4-hydroxy-7-(lower-alkanoyloxymethyl) - 1,8 - naphthyridine-3-carboxylate with a lower-alkanoic anhydride.

A composition aspect of the invention sought to be patented resides in the class of compounds which I designate lower-alkyl 7-[di-(lower-alkanoyloxy)methyl]-4-hydroxy-1,8-naphthyridine-3-carboxylates. Accordingly, I depict these compounds as having di-(lower-alkanoyl)methyl attached to the 7-position of a lower-alkyl 4-hydroxy-1,8-naphthyridine-3-carboxylate. These compounds are prepared by the above-described process aspect of the invention.

Another composition aspect of the invention sought to be patented resides in the class of compounds which I designate lower-alkyl 1,4-dihydro-7-[di-(lower-alkanoyloxy)-methyl] - 1 - (lower-alkyl)-4-oxo-1,8-naphthyridine-3-carboxylates. Accordingly, I depict these compounds as having di-(lower-alkanoyloxy)methyl attached to the 7-position of a lower-alkyl 1,4-dihydro-1-(lower-alkyl)-4-oxo-1,8-naphthyridine - 3 - carboxylate. These compounds are prepared as described hereinbelow.

As used throughout this specification, the term "lower-alkyl" means alkyl radicals having from one to six carbon atoms which can be arranged as straight or branched chains, and among which are, for purposes of illustration but without limiting the generality of the foregoing, methyl, ethyl, n-propyl, isopropyl, n-butyl, 2-butyl and n-hexyl.

As used throughout this specification, the term "lower-alkanoyl" means alkanoyl radicals having from one to six carbon atoms, including the straight- and branch-chained radicals, among which are, for purposes of illustration but without limiting the generality of the foregoing, formyl, acetyl, propionyl (n-propanoyl), butyryl (n - butanoyl), isobutyryl (2-methyl-n-propanoyl) and caproyl (n-hexanoyl).

As used throughout this specification, the term "lower-carbalkoxy" means carbalkoxy radicals where the alkoxy portion can be straight- or branch-chained and has from one to six carbon atoms, as illustrated by carbomethoxy, carbethoxy, carbo-n-propoxy, carbisopropoxy, carbo-n-butoxy and carbo-n-hexoxy.

The process aspect of the invention is carried out preferably by heating the appropriate 8-oxide with a lower-alkanoic anhydride, e.g., acetic anhydride, using a solvent; as solvent there can be used an excess of the anhydride or the corresponding alkanoic acid (e.g., acetic acid with acetic anhydride), or any solvent unreactive to said anhydrides, i.e. a solvent devoid of hydroxyl, sulfhydryl, or primary or secondary amino groups; thus, other suitable solvents include, without limitation, hydrocarbons, halohydrocarbons, tertiary-amines, ketones, ethers, tertiary-amides, nitriles, esters, and the like, satisfying the requirement of being liquid at reaction temperatures. Such solvents per se form no part of the invention, and their nature is well understood by the organic chemist. Examples of such solvents are acetonitrile, benzene, toluene and dimethylformamide. This reaction is generally carried out at a temperature in the range of about 70° C. to 150° C., preferably on a steam bath. This process aspect of the invention and the utilization of the compounds produced thereby is further illustrated as follows: the preparation of ethyl 7-acetoxymethyl-4-hydroxy-1,8-naphthyridine-3-carboxylate by heating 3 - carbethoxy-4-hydroxy-7-methyl-1,8-naphthyridine-8-oxide with acetic anhydride; and, the preparation of ethyl 7-(diacetoxymethyl) - 4 - hydroxy - 1,8-naphthyridine-3-carboxylate by heating 7-acetoxymethyl - 3 - carbethoxy - 4 - hydroxy-1,8-naphthyridine-8-oxide with acetic anhydride. The intermediate 8-oxides in each instance are obtained by oxidation of the corresponding 3-carbethoxy-4-hydroxy-7-substituted-1,8-naphthyridine (a known compound) with a peracid, e.g., peracetic acid, perbenzoic acid, 3-chloroperbenzoic acid, and the like.

The intermediate 4-hydroxy-7-methyl-1,8-naphthyridines used in my process are generally known or can be prepared by known procedures.

The products of the process aspect of my invention where the 7-substituent is lower-alkanoyloxy are useful as intermediates for the preparation of antibacterial agents, i.e., 1,4 - dihydro - 7 - (lower-alkanoyloxymethyl)-1-substituted-4-oxo-1,8-naphthyridine-3-carboxylic acids and derivatives, and the corresponding 7-hydroxymethyl compounds, which are disclosed and claimed in the copending Lesher and Gruett U.S. patent applications Ser. No. 244,-886, filed Dec. 17, 1962, now abandoned, and Ser. No. 399,333, filed Sept. 25, 1964. For example, ethyl 7-acetoxymethyl - 4 - hydroxy-1,8-naphthyridine-3-carrboxylate when reacted with ethyl iodide in dimethylformamide in the presence of anhydrous potassium carbonate yields ethyl 7 - acetoxymethyl - 1,4-dihydro-1-ethyl-4-oxo-1,8-naphthyridine-3-carboxylate which when heated with aqueous potassium hydroxide solution yields 1,4-dihydro-1-ethyl - 7 - hydroxymethyl-4-oxo-1,8-naphthyridine-3-carboxylic acid.

The products of the process aspect of my invention where the 7-substituent is di(lower-alkanoyloxy)methyl constitute one of the composition aspects of the instant invention. These lower-alkyl 7-[di-(lower-alkanoyloxy)methyl] - 4 - hydroxy-1,8-naphthyridine-3-carboxylates, or corresponding acids, are useful in the preparation of the compounds of the other composition aspect of the invention, namely, the lower-alkyl 1,4-dihydro-7-[di-(lower-alkanoyloxy)methyl] - 1 - (lower-alkyl)-4-oxo-1,8-naphthyridine-3-carboxylates, for example, ethyl 7-(diacetoxymethyl)-4-hydroxy-1,8-naphthyridine-3-carboxylate is reacted with ethyl iodide in dimethylformamide in the presence of anhydrous potassium carbonate to yield ethyl 7 - (diacetoxymethyl) - 1,4 - dihydro-1-ethyl-4-oxo-1,8-naphthyridine-3-carboxylate. This compound when heated with aqueous hydrochloric acid yields 1,4-dihydro-1-ethyl-7 - formyl-4-oxo-1,8-naphthyridine-3-carboxylic acid, a compound having antibacterial properties.

The 4-hydroxy-1,8-naphthyridines described herein exist in tautomeric forms. Illustrating this tautomerism in the case of Formula I,

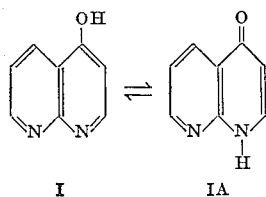

I    IA

As with all tautomeric systems, the rate of transformation I⇌IA, and the ratio of I/IA, are dependent on the thermodynamic environment, including the state of aggregation; so that measurements by any particular technique do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as IA, but nevertheless I have preferred to use the names based on structure I, although it is understood that either or both structures are comprehended.

The molecular structures of the compounds of my invention were assigned on the basis of study of their infrared, ultraviolet and nuclear magnetic resonance spectra and their transformation products, and confirmed by the correspondence of calculated and found values for the elementary analyses for representative examples.

The following examples will further illustrate the invention without, however, limiting it thereto.

EXAMPLE 1

A. 3-carbethoxy-4-hydroxy-7-methyl-1,8-naphthyridine-8-oxide: A mixture containing 23.2 g. of ethyl 4-hydroxy-7-methyl-1,8-naphthyridine-3-carboxylate, 25 cc. of peracetic acid and 250 cc. of acetic acid was heated with stirring for about six hours on a steam bath under a reflux condenser. The reaction mixture was concentrated in vacuo to a volume of about 50–75 cc. whereupon solid started to separate. The small amount of solid was filtered from the hot solution and washed with ethyl acetate. The filtrate and washings were combined, and allowed to cool. The solid that separated was collected, washed with ethanol, dried, recrystallized twice from dimethylformamide to yield 6.0 g. of 3-carbethoxy-4-hydroxy-7-methyl-1,8-naphthyridine-8-oxide, M.P. 250–255° C., with decomposition. This product was used in Example 1C without further purification.

B. 3 - carboxy-4-hydroxy-7-methyl-1,8-naphthyridine-8-oxide: A mixture containing 5.0 g. of 3-carbethoxy-4-hydroxy - 7 - methyl - 1,8-naphthyridine-8-oxide, 25 cc. of 10% aqueous potassium hydroxide and 25 cc. of water was heated on a steam bath for twenty-five minutes. The reaction mixture was recrystallized with the theoretical amount of 6N hydrochloric acid to a pH of 3. The resulting precipitate was collected, washed with water, recrystallized from about 250 cc. of dimethylformamide, washed and triturated with ethanol, and dried to yield 3.0 g. of 3 - carboxy - 4 - hydroxy - 7 - methyl - 1,8-naphthyridine-8-oxide, M.P. 305° C., with decomposition.

Analysis.—Calcd. for $C_{10}H_8N_2O_4$: C, 54.55; H, 3.66; N, 12.72. Found: C, 54.70; H, 3.71; N, 12.92.

C. Ethyl 7-acetoxymethyl-4-hydroxy-1,8-naphthyridine-3 - carboxylate: A mixture containing 11 g. of 3-carbethoxy - 4 - hydroxy - 7-methyl-1,8-naphthyridine-8-oxide, 6.1 g. of acetic anhydride and 35 cc. of acetic acid was heated with stirring on a steam bath for forty-five minutes and allowed to cool to room temperature. The solid that separated was collected, washed with ethyl acetate, and triturated with one liter of ethanol. The small amount of solid that did not dissolve was filtered off. The filtrate was heated to its boiling point on a steam bath, treated with decolorizing charcoal, filtered and the filtrate chilled. The solid that separated was collected and dried in vacuo at 70° C. to yield 6.0 g. of ethyl 7-acetoxymethyl - 4-hydroxy-1,8-naphthyridine-3-carboxylate, M.P. 249.3–249.8° C. (corr.).

Analysis.—Calcd. for $C_{14}H_{14}N_2O_5$: C, 57.93; H, 4.86; N, 9.65. Found: C, 57.88; H, 4.82; N, 9.49.

D. Ethyl 4 - hydroxy - 7 - propionoxymethyl - 1,8-naphthyridine - 3 - carboxylate is obtained following the procedure described in Example 1C using corresponding molar equivalent quantities of propionic anhydride and propionic acid in place of acetic anhydride and acetic acid, respectively.

E. Ethyl 7 - formyloxymethyl - 4 - hydroxy - 1,8-naphthyridine-3-carboxylate is obtained following the procedure described in Example 1C using a mixture of acetic anhydride and an excess of formic acid (mixture reacts to form a mixed anhydride of formic and acetic acid, and acts as a formylating agent) as the acylating agent.

F. 7-acetoxymethyl-4-hydroxy-1,8-naphthyridine is obtained following the procedure described in Example 1C using a corresponding molar equivalent quantity of 4-hydroxy-7-methyl-1,8-naphthyridine-8-oxide in place of 3 - carbethoxy - 4-hydroxy-7-methyl-1,8-naphthyridine-8-oxide - 4 - hydroxy-7-methyl-1,8-naphthyridine-8-oxide is obtained following the procedure described in Example 1A using a coresponding molar equivalent quantity of 4-hydroxy-7-methyl-1,8-naphthyridine in place of ethyl 4-hydroxy - 7 - methyl-1,8-naphthyridine-3-carboxylate. The 4 - hydroxy - 7 - methyl - 1,8-naphthyridine, M.P. 234.8–235.8° C. (corr.) is obtained by decarboxylation of 4-hydroxy-7-methyl-1,8-naphthyridine-3-carboxylic acid by heating the acid at 290° C. for about twenty minutes.

EXAMPLE 2

A. 7 - acetoxymethyl - 3 - carbethoxy - 4 - hydroxy-1,8-naphthyridine-8-oxide: A mixture containing 52 g. of ethyl 7-acetoxymethyl-4-hydroxy-1,8-naphthyridine-3-carboxylate, one liter of chloroform and 43 g. of 3-chloroperbenzoic acid was heated with stirring on a steam bath at about 60° C. for forty minutes. The chloroform was distilled off and about 800 cc. of ether was added with vigorous stirring. The resulting solid was collected, washed with ether, dried, recrystallized from about 400 cc. of dimethylformamide, washed with ethanol, and dried to yield 32 g. of 7-acetoxymethyl-3-carbethoxy-4-hydroxy-1,8-naphthyridine-8-oxide which was used in Example 2B. The above dimethylformamide filtrate was concentrated; the solid that separated was collected and recrystallized successively from dimethylformamide, ethanol and then dimethylformamide. The resulting solid was triturated with ethanol and dried to yield an additional 4.5 g. of 7-acetoxymethyl-3-carbethoxy-4-hydroxy-1,8-naphthyridine-8-oxide, M.P. 234.5–235.2° C. (corr.), with decomposition.

Analysis.—Calcd. for $C_{14}H_{14}N_2O_6$: C, 54.90; H, 4.61; N, 9.15. Found: C, 54.93; H, 4.43; N, 9.38.

B. Ethyl 7 - (diacetoxymethyl) - 4 - hydroxy - 1,8-naphthyridine-3-carboxylate: A mixture containing 31.8 g. of 7 - acetoxymethyl - 3 - carbethoxy - 4 - hydroxy-1,8-naphthyridine-8-oxide, 14 g. of acetic anhydride and 150 cc. of acetic acid was heated with stirring on a steam bath for about two hours. The hot reaction mixture was filtered, about 20 cc. of ethyl acetate was added to the filtrate, and the resulting mixture was allowed to stand. The solid that separated was collected, washed with ethyl acetate, recrystallized from ethanol using decolorizing charcoal, and dried in a vacuum oven at 60° C. to yield 20.0 g. of ethyl 7-(diacetoxymethyl)-4-hydroxy-1,8-naphthyridine-3-carboxylate, M.P. 238–240° C.

C. Ethyl 7- formyl-4-hydroxy-1,8-naphthyridine-3-carboxylate was obtained from the ethanolic filtrate of Example 2B as follows: The filtrate was concentrated and the solid that separated was collected, recrystallized twice from dimethylformamide, triturated twice with dimethylformamide and once with ethanol, and dried to yield 1.0 g. of ethyl 7-formyl-4-hydroxy-1,8-naphthyridine-3-carboxylate, M.P. 298.8–299.0° C. (corr.), with decomposition.

Analysis. Calcd. for $C_{12}H_{10}N_2O_4$: C, 58.79; H, 4.22; N, 11.24. Found: C. 58.53; H, 4.09; N, 11.38.

D. 7-formyl-4-hydroxy-1,8-naphthyridine-3-carboxylic acid is obtained following the procedure described in Example 5A using a molar equivalent of ethyl 7-(diacetoxymethyl) - 4-hydroxy - 1,8 - naphthyridine - 3 - carboxylate in place of ethyl 7-(diacetoxymethyl)-1,4-dihydro-1-ethyl-4-oxo-1,8-naphthyridine-3-carboxylate.

E. Ethyl 7-(dipropionoxymethyl)-4-hydroxy-1,8-naphthyridine-3-carboxylate is obtained following the procedures described above using corresponding molar equivalent quantities of ethyl 4-hydroxy-7-propionoxymethyl-1,8-naphthyridine-3-carboxylate and 3-chloroperbenzoic acid as in Example 2A to form 3-carbethoxy-4-hydroxy-7-propionoxymethyl-1,8-naphthyridine-8-oxide, and then reacting corresponding molar equivalent quantities of the 8-oxide and propionic anhydride using propionic acid as solvent, as in Example 2B.

F. Ethyl 7-(diformyloxymethyl)-4-hydroxy-1,8-naphthyridine-3-carboxylate is obtained following the procedures described above using corresponding molar equivalent quantities of ethyl 7-formyloxymethyl-4-hydroxy-1,8-naphthyridine-3-carboxylate and 3-chloroperbenzoic acid as in Example 2A to form 3-carbethoxy-7-formyloxymethyl-4-hydroxy-1,8-naphthyridine-8-oxide, and then reacting the 8-oxide with a mixture of acetic anhydride and an excess of formic acid, as in Example 2B.

EXAMPLE 3

A. Ethyl 7-(diacetoxymethyl)-1,4-dihydro-1-methyl-4-oxo-1,8-naphthyridine-3-carboxylate: To a solution containing 3.5 g. of ethyl 7-(diacetoxymethyl)-4-hydroxy-1,8-naphthyridine -3-carboxylate dissolved in 16 cc. of hot dry dimethylformamide was added 1.5 g. of anhydrous potassium carbonate followed by 0.8 cc. of methyl iodide, and the resulting reaction mixture was heated on a steam bath with stirring for thirty minutes. The hot reaction mixture was filtered to remove excess potassium carbonate. To the filtrate was added anhydrous ether to precipitate a tarry product which was washed twice with ether and then treated with about 75 cc. of water whereupon a white solid was obtained. The solid was collected, washed with water, and recrystallized from about 20 cc. of acetone to yield 1.6 g. of ethyl 7-(diacetoxymethyl)-1,4 - dihydro - 1 - methyl - 4 - oxo - 1,8 - naphthyridine-3-carboxylate, M.P. 152.0–153.0° C. (corr.).

Analysis.—Calcd. for $C_{17}H_{18}N_2O_7$: C, 56.35; H, 5.01; N, 7.73. Found: C, 56.52; H, 5.22; N, 7.94.

B. Ethyl 1,4-dihydro-7-(dipropionoxymethyl)-1-methyl-1,8-naphthyridine-3-carboxylate is obtained following the procedure described in Example 3A using corresponding molar equivalent quantities of ethyl 4-hydroxy-7-(dipropionoxymethyl) - 1,8 - naphthyridine - 3 - carboxylate, methyl iodide, dimethylformamide and anhydrous potassium carbonate.

C. Ethyl 7-(diformyloxymethyl)-1,4-dihydro-1-methyl-1,8-naphthyridine-3-carboxylate is obtained following the procedure described in Example 3A using corresponding molar equivalent quantities of ethyl 7-(diformyloxymethyl) - 4 - hydroxy - 1,8 - naphthyridine - 3 - carboxylate, methyl iodide, dimethylformamide and anhydrous potassium carbonate.

EXAMPLE 4

Ethyl 7 - (diacetoxymethyl) - 1 - ethyl - 1,4-dihydro-4-oxo-1,8-naphthyridine-3-carboxylate was obtained following the procedure described in Example 3A using 3.5 g. of ethyl 7-(diacetoxymethyl)-4-hydroxy-1,8-naphthyridine-3-carboxylate, 16 cc. of dry dimethylformamide, 1.5 g. of anhydrous potassium carbonate and 1.0 cc. of ethyl iodide. There was thus obtained 1.1 g. of the product, M.P. 136.0–137.0° C. (corr.).

Analysis.—Calcd. for $C_{18}H_{20}N_2O_7$: C, 57.44; H, 5.35; N, 7.44. Found: C, 57.56; H, 5.04; N, 7.62.

EXAMPLE 5

A. 1,4 - dihydro - 1 - ethyl - 8 - formyl - 4 - oxo - 1,8-naphthyridine-3-carboxylic acid: A mixture containing 5.5 g. of ethyl 7-(diacetoxymethyl)-1,4-dihydro-1-ethyl-4-oxo-1,8-naphthyridine-3-carboxylate, 25 cc. of 6 N hydrochloric acid and 75 cc. of water was boiled gently for about four minutes, then heated on a steam bath for fifteen minutes, and the resulting hot reaction mixture containing the precipitated product was filtered. The collected solid was washed and triturated with water, triturated with about 15 cc. of ethanol at room temperature, recrystallized from a small volume of dimethylformamide, triturated again with ethanol, and dried to yield 3.0 g. of 1,4-dihydro-1-ethyl-8-formyl-4-oxo-1,8-naphthyridine-3-carboxylic acid, M.P. 259.4–261.4° C. (corr.).

Analysis.—Calcd. for $C_{12}H_{10}N_2O_4$: C, 58.53; H, 4.09; N, 11.38. Found: C, 58.79; H, 4.11; N, 11.30.

1,4 - dihydro-1-ethyl-8-formyl-4-oxo-1,8-naphthyridine-3-carboxylic acid was found to have in vivo activity against *Klebsiella pneumoniae* in mice when administered subcutaneously at 200 mg./kg./day (8 out of 10 mice survived).

B. 1,4 - dihydro-8-formyl-4-oxo-1-methyl-1,8-naphthyridine-3-carboxylic acid is obtained following the procedure described in Example 5A using a molar equivalent quantity of ethyl 1,4-dihydro-7-(dipropionoxymethyl)-1-methyl-1,8-naphthyridine-3-carboxylate or ethyl 7-(diformyloxymethyl) - 1,4 - dihydro-1-methyl-1,8-naphthyridine-3-carboxylate in place of ethyl 7-(diacetoxymethyl)-1,4 - dihydro - 1-ethyl-4-oxo-1,8-naphthyridine-3-carboxylate.

EXAMPLE 6

A. Ethyl 7-(α-acetoxyethyl)-4-hydroxy-1,8-napthyridine-3-carboxylate is obtained following the procedure described in Example 1C using corresponding molar equivalent quantities of 3-carbethoxy-7-ethyl-4-hydroxy-1,8-naphthyridine-8-oxide, acetic anhydride and acetic acid. The intermediate 8-oxide is prepared following the procedure of Example 1A using corresponding molar equivalent quantities of ethyl 7-ethyl-4-hydroxy-1,8-naphthyridine-3-carboxylate, peracetic acid and acetic acid. The intermediate ethyl 7-ethyl-4-hydroxy-1,8-naphthyridine-3-carboxylate is prepared by a generally known procedure, as follows: reaction of 2-amino-6-ethylpyridine with diethyl ethoxymethylenemalonate to yield diethyl N - (6-ethyl-2-pyridyl)aminomethylenemalonate, M.P. 64–66° C.; heating the latter compound in diethyl phthalate to obtain ethyl 7-ethyl-4-hydroxy-1,8-naphthyridine-3-carboxylate, M.P. 254.4–256.2° C. (corr.), with decomposition. The 2-amino-6-ethylpyridine, M.P. 191–193° C., is obtained by amination of 2-ethylpyridine by refluxing a mixture containing it, sodamide and xylene for fifteen minutes.

B. Ethyl 7-(α,α-diacetoxyethyl)-4-hydroxy-1,8-naphthyridine-3-carboxylate is obtained following the procedure described in Example 2B using corresponding molar equivalent quantities of 7-(α-acetoxyethyl)-3-carbethoxy-4-hydroxy-1,8-naphthyridine-8-oxide, acetic anhydride and acetic acid. The intermediate 8-oxide is prepared following the procedure of Example 2A using corresponding molar equivalent quantities of ethyl 7-(α-acetoxyethyl) - 4 - hydroxy-1,8-naphthyridine-3-carboxylate, 3-chloroperbenzoic acid and chloroform.

C. Ethyl 7-(α,α-diacetoxyethyl)-1,4-dihydro-1-ethyl-4-oxo-1,8-naphthyridine-3-carboxylate is obtained following the procedure described in Example 3A using corresponding molar equivalent quantities of ethyl 7-(α,α-diacetoxyethyl) - 4-hydroxy-1,8-naphthyridine-3-carboxylate, ethyl iodide, dimethylformamide and anhydrous potassium carbonate.

D. 7 - acetyl - 1,4-dihydro-1-ethyl-4-oxo-1,8-naphthyridine-3-carboxylic acid is obtained following the procedure described in Example 5A using corresponding molar equivalent quantities of ethyl 7-(α,α-diacetoxyethyl)-1,4 - dihydro-1-ethyl-4-oxo-1,8-naphthyridine-3-carboxylate and aqueous hydrochloric acid. The corresponding ethyl ester is obtained by heating the acid and ethyl iodide in dimethylformamide in the presence of anhydrous potassium carbonate.

Other 1,4-dihydro-7-(lower-alkanoyl)-1-(lower-alkyl)-4-oxo-1,8-naphthyridine-3-carboxylic acids, and lower-alkyl esters, can be obtained following the series of steps shown above in Examples 6A through 6D, starting with the appropriate corresponding 4-hydroxy-7-(lower-alkyl)-3-(lower-carbalkoxy)-1,8-naphthyridine-8-oxide, e.g., 1,4-dihydro - 1 - ethyl-4-oxo-7-propionyl-1,8-naphthyridine-3-carboxylic acid, starting with 3-(carbethoxy)-4-hydroxy-7-n-propyl-1,8-naphthyridine-8-oxide.

The subject matter which the applicant regards as his invention is particularly pointed out and distinctly claimed as follows:

1. A lower-alkyl 7-[di-(lower-alkanoyloxy)methyl]-4-hydroxy-1,8-naphthyridine-3-carboxylate.
2. Ethyl 7 - (diacetoxymethyl)-4-hydroxy-1,8-naphthyridine-3-carboxylate.
3. A lower - alkyl 1,4-dihydro-7-[di-(lower-alkanoyloxy)methyl] - 1 - (lower-alkyl)-4-oxo-1,8-naphthyridine-3-carboxylate.
4. Ethyl 7 - (diacetoxymethyl)-1,4-dihydro-1-methyl-4-oxo-1,8-naphthyridine-3-carboxylate.
5. Ethyl 7 - (diacetoxymethyl) - 1,4-dihydro-1-ethyl-4-oxo-1,8-naphthyridine-3-carboxylate.

References Cited

UNITED STATES PATENTS 3,149,104  9/1964  Lesher et al. _____ 260—240

OTHER REFERENCES

Klingsberg: Pyridine and Derivatives, Part 2, Interscience (1961), pp. 125–127.

Klingsberg: Pyridine and Derivatives, Part 3, Interscience (1962), pp. 644 and 645.

NORMA S. MILESTONE, Primary Examiner.

A. L. ROTMAN, Assistant Examiner.

U.S. DEPARTMENT OF COMMERCE
PATENT OFFICE
Washington, D.C. 20231

UNITED STATES PATENT OFFICE
CERTIFICATE OF CORRECTION

Patent No. 3,404,153                                          October 1, 1968

George Y. Lesher

It is certified that error appears in the above identified patent and that said Letters Patent are hereby corrected as shown below:

Column 2, line 54, "3-carrboxylate" should read -- 3-carboxylate --. Column 5, line 66, "3-carboxylate-" should read -- 3-carboxylate, --. Column 6, lines 15, 27, 32 and 37, before "formyl", each occurrence, "8" should read -- 7 --.

Signed and sealed this 3rd day of March 1970.

(SEAL)
Attest:

Edward M. Fletcher, Jr.                             WILLIAM E. SCHUYLER, JI
Attesting Officer                                        Commissioner of Patents